US009406388B2

(12) United States Patent
De Santis et al.

(10) Patent No.: US 9,406,388 B2
(45) Date of Patent: Aug. 2, 2016

(54) MEMORY AREA PROTECTION SYSTEM AND METHODS

(75) Inventors: Luca De Santis, Avezzano (IT); Maria Luisa Gallese, Avezzano (IT); Giuliano Gennaro Imondi, Rieti (IT)

(73) Assignee: Micron Technology, Inc., Boise, ID (US)

( * ) Notice: Subject to any disclaimer, the term of this patent is extended or adjusted under 35 U.S.C. 154(b) by 2414 days.

(21) Appl. No.: 11/795,358

(22) PCT Filed: May 10, 2007

(86) PCT No.: PCT/US2007/068653
§ 371 (c)(1),
(2), (4) Date: Jul. 12, 2007

(87) PCT Pub. No.: WO2009/105055
PCT Pub. Date: Aug. 27, 2009

(65) Prior Publication Data
US 2010/0138623 A1    Jun. 3, 2010

(51) Int. Cl.
*G11C 16/22* (2006.01)
*G06F 21/79* (2013.01)

(52) U.S. Cl.
CPC ............... *G11C 16/22* (2013.01); *G06F 21/79* (2013.01)

(58) Field of Classification Search
CPC . G06F 21/60; G06F 21/78; G06F 2221/2113; G06F 12/14; G06F 21/74; G06F 21/79; G06F 2221/2129; G06F 12/0866; G06F 12/145; G06F 1/1626; G06F 21/52; G06F 2212/2022; G06F 11/1048; Y02B 60/1225; G11C 13/00; G11C 13/0069; G11C 16/10; G11C 16/3436; G11C 16/3445; G11C 16/3459; G11C 2013/0071; G11C 2013/0076; G11C 29/52; G11C 16/00; G11C 16/22
USPC ................. 711/100, 102–103, 162–164, 166
See application file for complete search history.

(56) References Cited

U.S. PATENT DOCUMENTS

| | | | |
|---|---|---|---|
| 5,530,827 A * | 6/1996 | Matsui | G06F 3/0601 711/103 |
| 5,978,275 A * | 11/1999 | Song | G11C 16/16 365/185.11 |
| 7,076,623 B1 * | 7/2006 | Ito et al. | 711/163 |
| 7,430,585 B2 * | 9/2008 | Sibert | 709/216 |
| 8,645,616 B2 * | 2/2014 | Periyannan | 711/103 |
| 2003/0093628 A1 * | 5/2003 | Matter et al. | 711/153 |
| 2004/0199786 A1 | 10/2004 | Walmsley et al. | |
| 2005/0102478 A1 * | 5/2005 | Tanaka et al. | 711/152 |
| 2005/0182985 A1 | 8/2005 | Shipton et al. | |
| 2005/0213761 A1 | 9/2005 | Walmsley et al. | |
| 2005/0268058 A1 * | 12/2005 | Drasnin et al. | 711/163 |
| 2007/0016735 A1 * | 1/2007 | Mastroianni | G06F 12/1433 711/156 |

(Continued)

OTHER PUBLICATIONS

International Search Report & Written Opinion for PCT Appl. No. PCT/US2007/068653 dated Jul. 20, 2009.

*Primary Examiner* — Zhuo Li
(74) *Attorney, Agent, or Firm* — Dorsey & Whitney LLP (57) ABSTRACT

In one embodiment, a non-volatile memory device includes a plurality of protection bits denoting that an area of memory in the device must be protected from being erased or programmed. The memory device further includes a majority logic circuit for determining the logic state of the majority of the plurality of protection bits. Another embodiment includes a pattern generator for generating the logic levels to be stored in the plurality of protection bits.

33 Claims, 6 Drawing Sheets

(56) References Cited

U.S. PATENT DOCUMENTS

| | | | |
|---|---|---|---|
| 2007/0157000 A1* | 7/2007 | Qawami et al. | 711/170 |
| 2007/0247905 A1* | 10/2007 | Rudelic | 365/185.04 |
| 2008/0304339 A1* | 12/2008 | Dietrich | G11C 13/00 365/189.16 |
| 2009/0059673 A1* | 3/2009 | Willer | G11C 16/26 365/185.21 |

* cited by examiner

MEMORY AREA PROTECTION SYSTEM AND METHODS

TECHNICAL FIELD

Embodiments of the invention relate to non-volatile memory devices, and, more particularly, in one embodiment to non-volatile memory device one-time programmable (OTP) memory area protection.

BACKGROUND OF THE INVENTION

Mobile telephones and other portable electronic devices often contain non-volatile memory such as NAND Flash memory. Typically, such applications require memory with a one-time programmable ('OTP') memory area. The OTP memory area may be used to store information only once. In a mobile phone application, the OTP memory area is typically used to store the mobile phone International Mobile Equipment Identity (IMEI) number. The IMEI number is used to uniquely identify a particular mobile phone handset. When a mobile phone has been lost or stolen, the IMEI number for that mobile phone is added to a blacklist. Every time the mobile phone attempts to access the cellular network, its IMEI number is checked against the blacklist. If the IMEI number is found on the blacklist, the mobile phone is refused access to the network.

In the past, means were developed for changing the IMEI number on a mobile phone so that a stolen phone could be re-used. In an effort to prevent people from changing the IMEI number, mobile phone manufacturers have increasingly turned to memory manufacturers to supply memories with OTP memory areas. After the OTP memory area has been used to store the IMEI number, and other information, it is not possible to re-program that memory. This effectively prevents a stolen phone from ever being re-used.

The OTP memory area in standard flash memory devices is typically comprised of a page of memory coincident with an array word-line dedicated for OTP purposes. The OTP memory area is also associated with an OTP protection bit. Prior art devices dedicate a single bit of flash memory for storing the OTP protection bit. When this bit is clear, the OTP memory area may be programmed, erased and re-programmed by the user just like any other area of memory in the device. In other prior art devices, the user can only write the OTP, while the erase operation is reserved to the manufacturer. If the OTP protection bit is set, the OTP memory area may no longer be programmed, erased or re-programmed in any fashion. Moreover, once the OTP protection bit is set, the OTP protection bit itself may never be cleared.

In a typical application, such memory devices are shipped from the manufacturer with the OTP memory area and the OTP protection bit erased and thereby enabled for storing data. The mobile phone manufacturer may then program the OTP memory area of the device with, for example, the IMEI number. After final programming of the OTP memory area, the mobile phone manufacturer sets the OTP protection bit which forever locks both the OTP memory area and OTP protection bit and prevents further programming or re-programming.

While such prior art methods of protecting the OTP memory area are generally effective, they are not always reliable. If, for example, the OTP protection bit is cleared, the OTP memory area could again be programmed. Ordinarily, the OTP protection bit may only be erased by the memory device manufacturer. The OTP protection bit may, however, accidentally flip under certain circumstances rendering the OTP memory area vulnerable to erasure and/or reprogramming.

The present inventors have recognized there is therefore a need, for example, for a non-volatile memory device that can more reliably protect the OTP memory area.

DETAILED DESCRIPTION

The embodiments explicitly disclosed below are directed to a non-volatile memory device with a multi-bit OTP memory area protection. Certain details are set forth below to provide a sufficient understanding of the invention. However, it will be clear to one skilled in the art that the invention may be practiced without these particular details. For example, although it may be possible to simplify the overall design using multi-level cell flash memories, the invention has equal applicability in both multi-level and single-level cell flash memories.

In one embodiment of the invention, one 8-bit byte of flash memory is dedicated to controlling access to the OTP memory area instead of the 1 bit of prior art devices. As will be discussed more fully below, the bits of this byte, the OTP protection byte, are then fed to a logic unit such that the protection state of the OTP memory area is governed by the majority of the bits in the byte. That is, if the majority of the bits in the byte are set, then the OTP memory area is in the protected state and neither the OTP memory area or the OTP protection byte may be erased or re-programmed. Likewise, if the majority of the bits are not set, the OTP memory area and the OTP protection byte may be programmed (e.g., or re-programmed). This should result in more reliable maintenance of the OTP memory area protection (e.g., since it is very unlikely that a majority of the OTP protection bits will somehow change state). Although embodiments are discussed in terms of an 8-bit OTP protection byte, a greater or lesser number of bits may be used with the majority logic in an analogous manner. For example, for multi-byte protection, the majority logic proposed in this embodiment, can be placed several times, once for each byte, with a subsequent OR gate to combine their results. As an alternative, it can be placed only once having an associated processor that provides placing the bytes in sequence one after the other, at its inputs, and to collect and to process the results.

Figure 1:
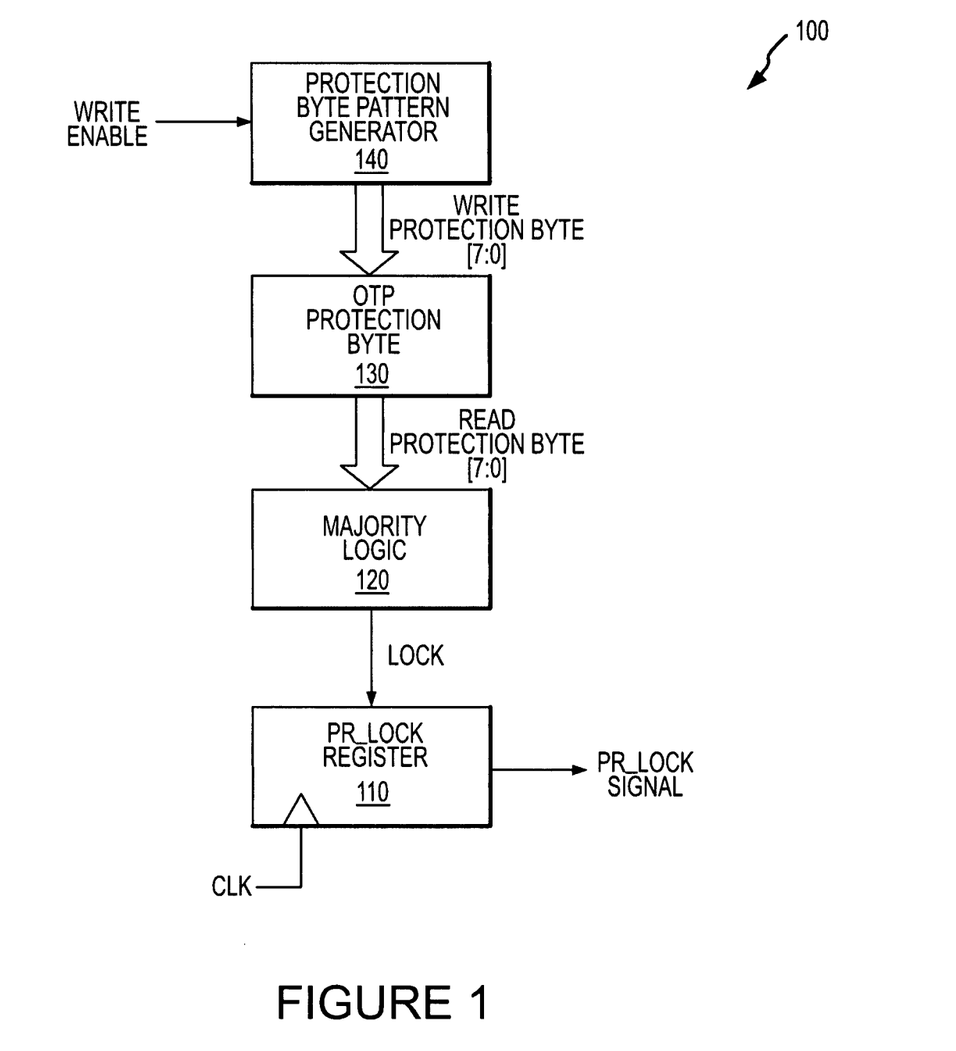
FIG. 1 is a block diagram of a multi-bit OTP memory area protection system according to one embodiment of the invention.

FIG. 1 is a block diagram of a multi-bit OTP memory area protection system 100 according to one embodiment of the invention. When the memory device is powered up, the content of an OTP protection byte 130 is read from the memory array and its data is routed to a majority logic circuit 120. The majority logic circuit 120 computes the logical state of the majority of the bits of the OTP protection byte 130. This logical state is then stored in a pr_lock register 110. The pr_lock register 110 typically would store a logic '1' when the OTP memory area is protected (e.g., locked). If the pr_lock register 110 indicates that the OTP memory area is protected, any attempt to re-program that area will be aborted by the device. If, however, the pr_lock register 110 indicates the OTP memory area is not protected, programming of the OTP memory area will be allowed. At the end of programming the OTP memory area, the OTP protection byte 130 also needs to be programmed to protect the OTP memory area. An OTP protection byte pattern generator 140 creates the bit pattern required, which is then used to program the OTP protection byte 130 in the OTP memory protection area at the appropriate time. In one embodiment, as is discussed in more detail below, the bit pattern may be 80h. After programming the OTP protection byte, it should not be possible to re-program the OTP memory protection area and OTP protection byte.

Figure 2:
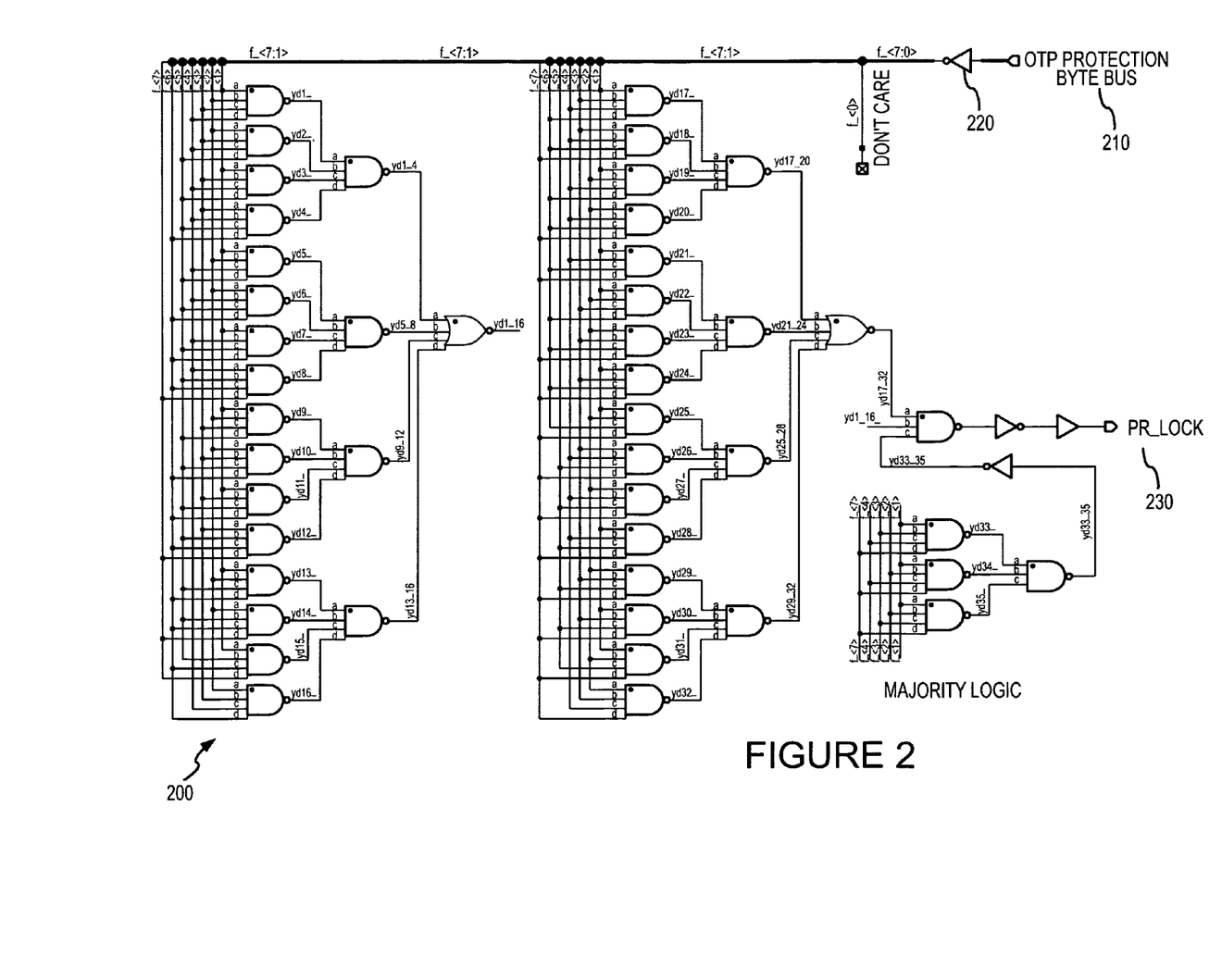
FIG. 2 is a schematic diagram of a majority logic circuit according to one embodiment of the invention.

FIG. 2 illustrates a majority logic circuit 200 according to one embodiment of the invention. The OTP protection byte is read and its data are routed to the majority logic circuit 200 via an OTP protection byte bus 210. Each of the 8 bits is fed through inverters 220 creating the complement of the OTP protection byte. The least significant bit is ignored. The upper 7 bits are routed to a multi-level NAND and NOR array. The output to a pr_lock circuit 230 will be logic high if the majority of the 7 most significant bits of the OTP protection byte are logic high. Likewise, the output to the pr_lock circuit 230 will be logic low where the majority of the 7 most significant bits are logic low. Again, although described in terms of a majority of 7 bits, any number of bits could be used with an appropriate majority logic circuit.

Figure 3:
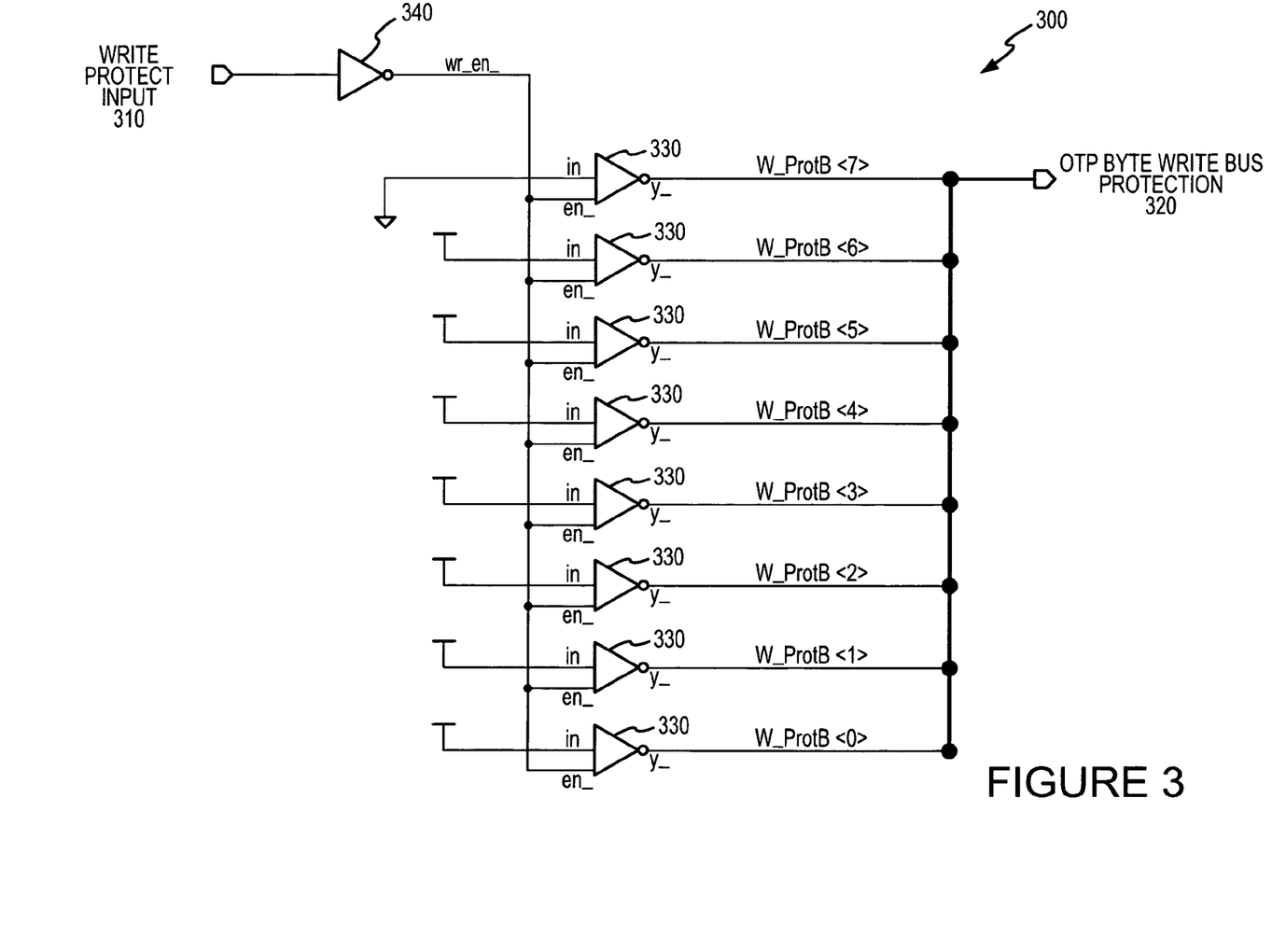
FIG. 3 is a schematic diagram of a multi-bit OTP memory area protection byte pattern generator according to one embodiment of the invention.

FIG. 3 illustrates an OTP protection byte pattern generator 300 according to one embodiment of the invention. In one embodiment, the pattern generated is a logical 80h. That is, the 7 least significant bits are logic high, and the most significant bit is logic low. In at least some embodiments, such an arrangement allows re-use of circuits already existing in, for example, multi-level cell NAND flash devices. The OTP protection byte pattern generator 300 is comprised of an inverting input buffer 340 that creates an active-low write enable signal from the signal on the write protect input 310. This signal is used to enable the output of several inverting tri-state buffers 330 according to their respective input signals. The outputs of the buffers 330 are then routed to the OTP protection byte via an OTP protection byte write bus 320 for programming the OTP protection byte at the appropriate time.

Figure 4:
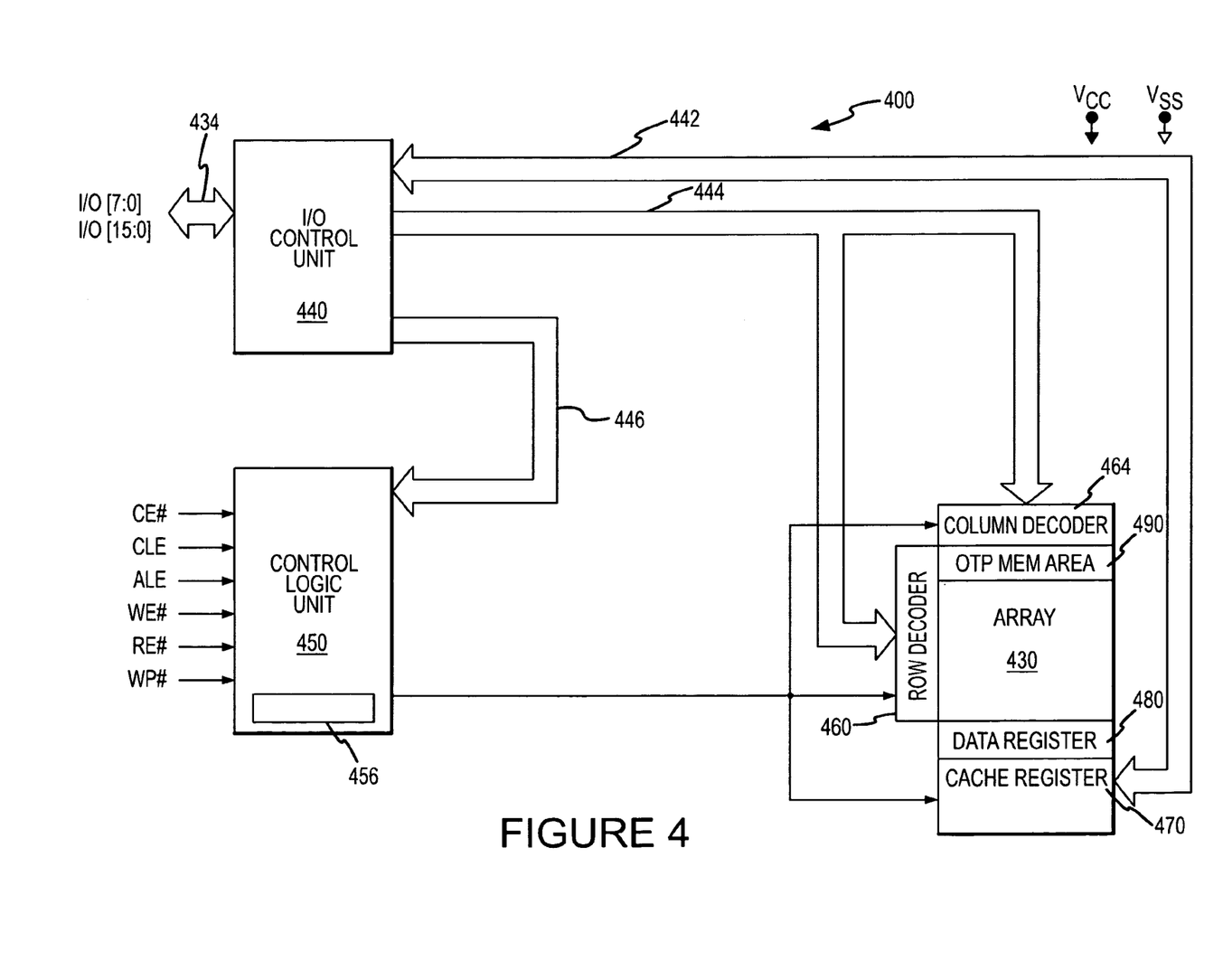
FIG. 4 is a block diagram of a flash memory device according to one embodiment of the invention.

A flash memory device 400 that includes the multi-bit OTP memory area protection system according to one embodiment of the invention is shown in FIG. 4. The flash memory device 400 includes an array 430 of flash memory cells arranged in banks of rows and columns. Most command signals, the address signals and the write data signals are applied to the memory device 400 as sets of sequential input/output ("I/O") signals transmitted through an I/O bus 434. Similarly, read data signals are output from the flash memory device 400 through the I/O bus 434. The I/O bus is connected to an I/O control unit 440 that routes the signals between the I/O bus 434 and an internal data bus 442, an internal address bus 444, and an internal command bus 446. The flash memory device 400 also includes a control logic unit 450 that receives a number of control signals either externally or through the command bus 446 to control the operation of the memory device 400. The address bus 444 applies row address signals to a row decoder 460 and column address signals to a column decoder 464. The row decoder 460 includes a word line driver system which drives the word lines of the memory array 430 with appropriate voltages corresponding to the decoded row address signals and the type of memory operation. Similarly, the column decoder 464 enables write data signals to be applied to bit lines for columns corresponding to the column address signals and allow read data signals to be coupled from bit lines for columns corresponding to the column address signals.

In response to the memory commands decoded by the control logic unit 450, the flash memory cells in the array 430 are erased, programmed, or read. The memory array 430 is programmed on a row-by-row or page-by-page basis. After the row address signals have been applied to the address bus 444, the I/O control unit 440 routes write data signals to a cache register 470. The write data signals are stored in the cache register 470 in successive sets each having a size corresponding to the width of the I/O bus 434. The cache register 470 sequentially stores the sets of write data signals for an entire row or page of flash memory cells in the array 430. All of the stored write data signals are then used to program a row or page of memory cells in the array 430 selected by the row address coupled through the address bus 444. In a similar manner, during a read operation, data signals from a row or page of memory cells selected by the row address coupled through the address bus 444 are stored in a data register 480. Sets of data signals corresponding in size to the width of the I/O bus 434 are then sequentially transferred through the I/O control unit 440 from the data register 480 to the I/O bus 434. In some devices, the data register 480 and the cache register 470 are not distinct registers. Instead, they are unified in a single, more complex, circuitry implementing both their functions. This is usually done to save silicon area. The control logic unit 450, or some other component or location in the flash memory device 400, also includes a multi-bit OTP memory area protection system 456, which interfaces with the OTP memory area 490. The multi-bit OTP memory area protection system 456 may be the system 100 shown in FIG. 1 or a multi-bit OTP memory area protection system according to some other embodiment of the invention.

Figure 5:
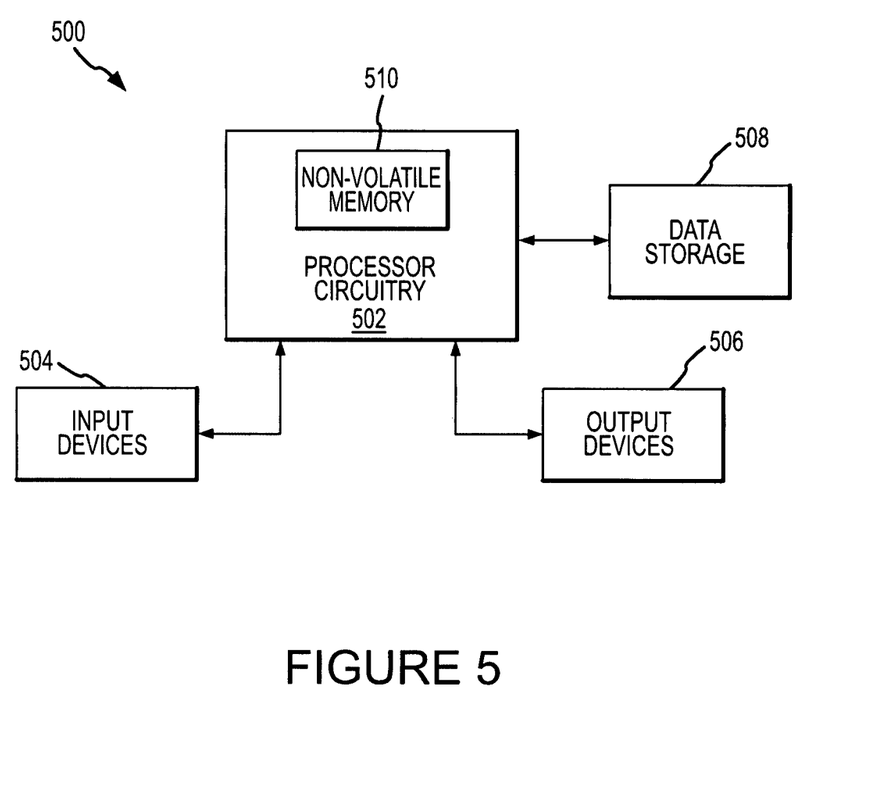
FIG. 5 is a block diagram of a processor-based system according to one embodiment of the invention.

FIG. 5 is a block diagram of a system 500 having a processor (not shown), such as one where the processor is part of processor circuitry 502 that might include a non-volatile memory device 510, such as one similar to that shown in FIG. 4. The processor circuitry 502 is coupled through address, data, and control buses to the non-volatile memory 510 to provide for writing data to and reading data from the non-volatile memory 510. The processor and/or processor circuitry 502 includes circuitry for performing various processing functions, such as executing specific software to perform specific calculations or tasks. The system 500 also includes one or more input devices 504 coupled to the processor circuitry 502 to allow an operator to interface with the system 500. Examples of input devices 504 include keypads, touch screens, and scroll wheels. The system 500 also includes one or more output devices 506 coupled to the processor circuitry 502 to provide output information to the operator. In one example, the output device 506 is a visual display providing visual information to the operator. Data storage 508 is also coupled to the processor circuitry 502 to store data that is to be retained even when power is not supplied to the system 500 or to the data storage 508.

Figure 6:
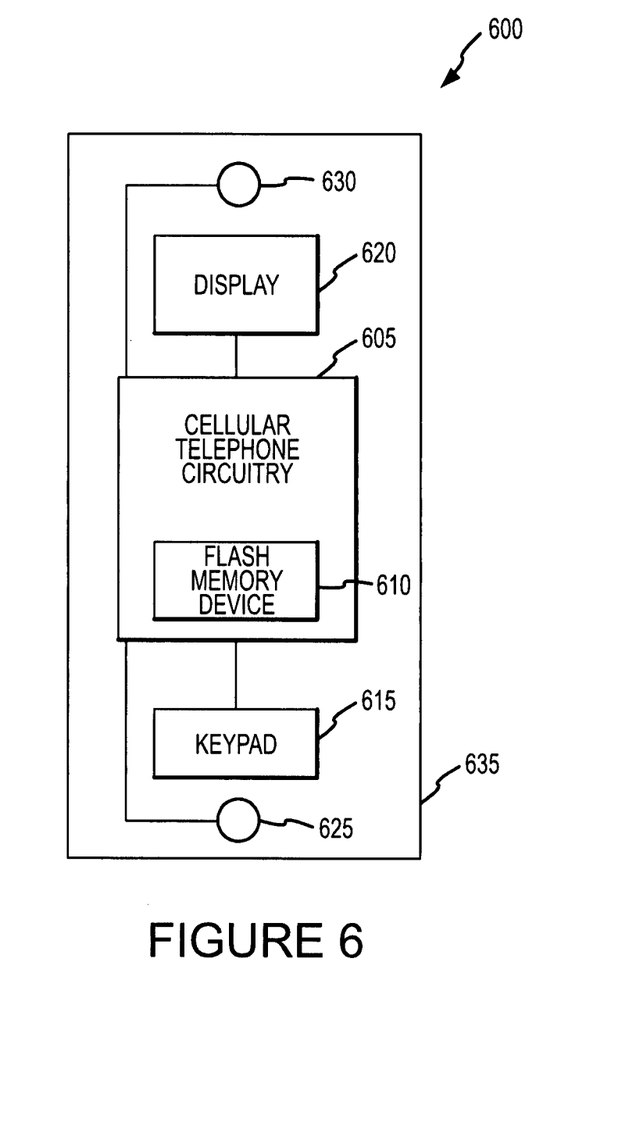
FIG. 6 is a block diagram of a cellular phone according to one embodiment of the invention.

As mentioned above, embodiments of the multi-bit OTP memory area protection system can be used in various electronic devices. For example, they may be used in a cellular telephone, such as a cellular telephone 600 shown in FIG. 6. The cellular telephone 600 includes conventional or hereinafter developed cellular telephone circuitry 605 such as circuitry that may include a flash memory device 610. The flash memory device 610 contains an embodiment of the multi-bit OTP memory area protection system. The flash memory device 610 may be, for example, that illustrated in FIG. 4 above or may be some other embodiment. The cellular telephone circuitry 605 is also connected to a keypad 615, a display 620, a microphone 625, and a loudspeaker 630. The cellular telephone 600 has a housing 635 enclosing the cellular telephone circuitry 605.

Although the present invention has been described with reference to the disclosed embodiments, persons skilled in the art will recognize that changes may be made in form and detail without departing from the invention. Such modifications are well within the skill of those ordinarily skilled in the art. Accordingly, the invention is not limited except as by the appended claims.

We claim:

1. A method of protecting a memory area comprising:
   programming a plurality of memory cells with a predetermined level;
   computing a logical state of a majority of the plurality of memory cells; and
   preventing memory cells in the memory area from being programmed responsive to the logical state being a first value,
   wherein the logical state has the first value when the majority of the plurality of memory cells stores the predetermined level.

2. The method of claim 1 further comprising:
   preventing the plurality of memory cells from being programmed with data responsive to the logical state being the first value.

3. The method of claim 2 further comprising:
   allowing the memory cells in the memory area and the plurality of memory cells to be programmed with data responsive to the logical state being a second value that is different from the first value.

4. The method of claim 3 wherein the plurality of memory cells comprise an odd number of memory cells.

5. The method of claim 1, further comprising programming a plurality of memory cells with data prior to computing the logical state.

6. A memory area protection system comprising:
   a plurality of memory cells;
   a protection bit pattern generator operable to generate a pattern of protection bits, each protection bit having a predetermined level, and to program the plurality of memory cells with the pattern of protection bits;
   a logic circuit coupled to the plurality of memory cells and operable to read the protection bits according to data stored in the plurality of memory cells;
   a register coupled to the logic circuit and operable to prevent memory cells in the memory area from being programmed responsive to more than a predetermined number of bits having the predetermined level in the protection bits,
   wherein the logic circuit is configured to determine whether more than the predetermined number of bits have the predetermined level in the protection bits.

7. The memory area protection system of claim 6 wherein the register is further operable to prevent the plurality of memory cells from being programmed with data responsive to more than the predetermined number of bits of the protection bits having the predetermined level.

8. The memory area protection system of claim 7 wherein the register is further operable to allow the memory cells in the memory area and the plurality of memory cells to be programmed responsive to less than the predetermined number of bits of the protection bits having the predetermined level.

9. The memory area protection system of claim 6 wherein the plurality of memory cells comprise an odd number of memory cells.

10. The memory area protection system of claim 6 wherein the register is operable to prevent the memory cells in the memory area from being programmed responsive to the majority of the protection bits having the predetermined level.

11. A memory device comprising:
    an array of memory cells comprising a first and a second set of memory cells;
    a first logic circuit coupled to the first set of the memory cells and operable to determine a logical state of a majority of the memory cells in the first set of memory cells;
    a second logic circuit coupled to the memory cells in the second set of memory cells and to the first logic circuit and operable to prevent the memory cells in the second set of memory cells from being programmed responsive to the logical state having a first value,
    wherein the logical state has the first value when the majority of the memory cells in the first set has a predetermined logic level.

12. The memory device of claim 11 wherein the second logic circuit is further operable to prevent the memory cells in the first set of memory cells from being programmed responsive to the logical state having the first value.

13. The memory device of claim 12 wherein the second logic circuit is further operable to allow the memory cells in the first and second sets of memory cells to be programmed responsive to the logical state having a second value that is different from the first value.

14. The memory device of claim 11 wherein the array of memory cells further comprises a third set of memory cells, and wherein the second logic circuit is further operable to allow the memory cells in the third set of memory cells to be programmed without regard for the value of the logical state.

15. The memory device of claim 11 wherein the memory cells in the first set of memory cells comprise an odd number of memory cells.

16. The memory device of claim 11, further comprising a protection bit pattern generator operable to generate a pattern of bits and to program the memory cells in the first set of memory cells with the pattern of protection bits.

17. A system comprising:
    a processor operable to process data and to provide memory commands and addresses; and
    a memory device comprising:
    an array of memory cells comprising a first and a second set of memory cells;
    a first logic circuit coupled to the first set of the memory cells and operable to determine a logical state of a majority of the memory cells in the first set of memory cells; and
    a second logic circuit coupled to the memory cells in the second set of memory cells and to the first logic circuit and operable to prevent the memory cells in the second set of memory cells from being programmed responsive to the logical state having the first value,
    wherein the logical state has the first value when the majority of the memory cells in the first set has a predetermined logic level.

18. The system of claim 17 wherein the second logic circuit is further operable to prevent the memory cells in the first set of memory cells from being programmed responsive to the logical state having the first value.

19. The system of claim 18 wherein the second logic circuit is further operable to allow the memory cells in the first and second sets of memory cells to be programmed responsive to the logical state having a second value that is different from the first value.

20. The system of claim 17 wherein the array of memory cells further comprises a third set of memory cells, and wherein the second logic circuit is further operable to allow the memory cells in the third set of memory cells to be programmed without regard for the value of the logical state.

21. The system of claim 17 wherein the memory cells in the first set of memory cells comprise an odd number of memory cells.

22. The system of claim 17, further comprising a protection bit pattern generator operable to generate a pattern of bits and to program the memory cells in the first set of memory cells with the pattern of protection bits.

23. A method of protecting a memory area comprising:
programming each of a plurality of memory cells to store a predetermined level indicative of a protection state;
reading data from the plurality of memory cells;
determining whether more than a predetermined number of bits of the data have the predetermined level;
preventing the memory area from being programmed if more than the predetermined number of bits of the data read have the predetermined level.

24. The method of claim 23 further comprising:
preventing the plurality of memory cells from being programmed if more than the predetermined number of bits of the data read have a predetermined level.

25. The method of claim 23 further comprising:
allowing data to be written to memory cells in the memory area and to the memory cells in the plurality of memory cells if less than a predetermined number of bits of the data read have the predetermined level.

26. The method of claim 23 wherein the predetermined number of bits comprise an odd number of bits.

27. The method of claim 23 wherein the act of preventing the memory area from being programmed if more than the predetermined number of bits of the data read have the predetermined level comprises preventing the memory area from being programmed if more than half of bits of the data read have the predetermined level.

28. A wireless telephone comprising:
telephone circuitry including a memory device, comprising:
an array of memory cells comprising a first and a second set of memory cells;
a first circuit coupled to the first set of the memory cells and operable to determine a logical state of a majority of the memory cells in the first set of memory cells; and
a second circuit coupled to the memory cells in the second set of memory cells and to the first circuit and operable to prevent memory cells in the second set of memory cells from being programmed responsive to the logical state having a first value,
wherein the logical state has the first value when the majority of the memory cells in the first set has a predetermined logic level.

29. The wireless telephone of claim 28 wherein the second circuit is further operable to prevent the memory cells in the first set of memory cells from being programmed responsive to the logical state having the first value.

30. The wireless telephone of claim 29 wherein the second circuit is further operable to allow the memory cells in the first and second set of memory cells to be programmed responsive to the logical state having a second value that is different from the first value.

31. The wireless telephone of claim 28 wherein the array of memory cells further comprises a third set of memory cells, and wherein the second circuit is further operable to allow the memory cells in the third set of memory cells to be programmed without regard for the value of the logical state.

32. The wireless telephone of claim 28 wherein the memory cells in the first set of memory cells comprise an odd number of memory cells.

33. The wireless telephone of claim 28, further comprising a protection bit pattern generator operable to generate a pattern of bits and to program the memory cells in the first set of memory cells with the pattern of protection bits.

* * * * *